D. JOHNSON.
SHEARS.
APPLICATION FILED MAY 6, 1919.
1,350,653.
Patented Aug. 24, 1920.
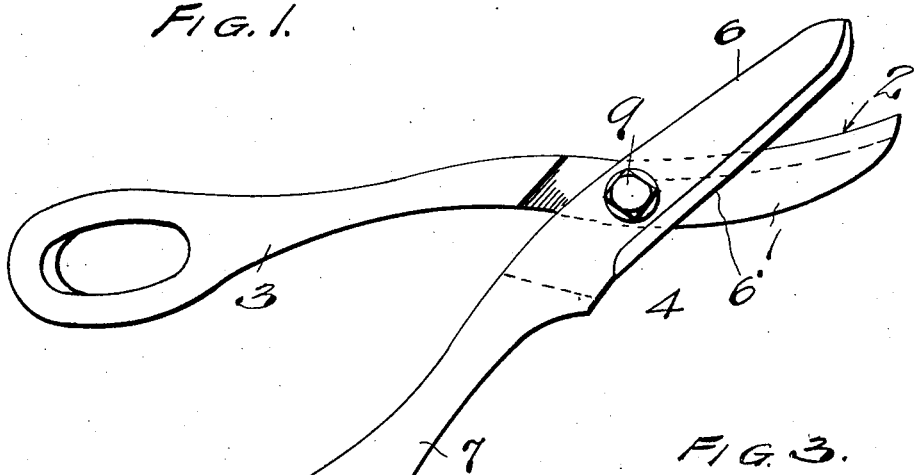
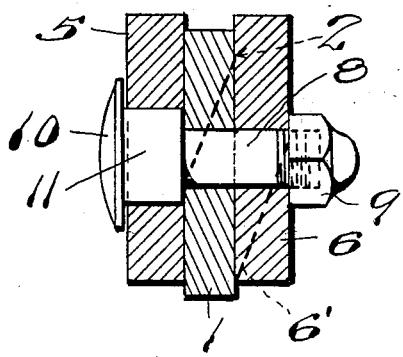
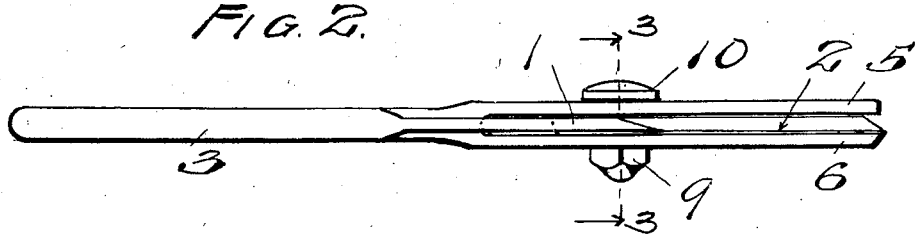
INVENTOR
Dolph Johnson
Herbert E. Smith
ATTORNEY

UNITED STATES PATENT OFFICE.

DOLPH JOHNSON, OF BURKE, IDAHO, ASSIGNOR OF ONE-HALF TO JOHN CARLSON, OF MULLAN, IDAHO.

SHEARS.

1,350,653.  Specification of Letters Patent.  Patented Aug. 24, 1920.

Application filed May 6, 1919. Serial No. 295,104.

*To all whom it may concern:*

Be it known that I, DOLPH JOHNSON, a citizen of the United States, residing at Burke, in the county of Shoshone and State of Idaho, have invented certain new and useful Improvements in Shears, of which the following is a specification.

The present invention relates to improvements in shears designed especially for cutting sheet metal such as tin, whether in the form of plates or in manufactured articles like stove pipe, etc., and the shears are specially adapted for making a clear and clean cut in the sheet metal.

The invention consists essentially in certain novel combinations of parts involving the cutting jaws of the shears, and the pivot joint of the jaws in connection with a co-acting guard for the shears, as will be more fully described hereinafter and more specifically set forth in the claim.

In the accompanying drawings one complete example of the physical embodiment of the invention is illustrated, the parts being combined and arranged according to the best mode I have so far devised for the practical application of the principles of the invention.

Figure 1 is a view of a pair of shears embodying the essential features of the invention, the shears being shown partly open for convenience of illustration.

Fig. 2 is an edge view of the shears.

Fig. 3 is an enlarged, transverse sectional view through the pivot bolt at line 3—3 of Fig. 2.

In the preferred form of the invention as illustrated in the drawings the shears are of the crossed handle type with the two cutting jaws, one of which, in the present instance is of special and novel construction. The cutting jaw 1 has a beveled cutting edge 2 and is fashioned with the handle 3 of typical form, while the other member of the shears, indicated as a whole by the numeral 4, is specially constructed to co-act with the cutting blade 1. The member 4 is bifurcated at its working end and fashioned with a plane guard member 5 and a spaced cutting jaw 6 spaced therefrom and this cutting jaw has a beveled cutting edge 6′ to co-act in the usual shearing motion with the edge 2 of the jaw 1.

The shears are operated through the instrumentality of the two handles 3 and 7, with the jaw 1 pivoted in the bifurcated end of the member 4 on the pivot bolt 8 passing through the three elements 1, 5 and 6, as seen in Fig. 3.

The shearing or cutting edges of the jaws are brought together by the clamp nut 9 on the threaded end of the pivot bolt 8 and the head 10 of the bolt holds the guard 5 in place. It will be noted, however, in Fig. 3 that the guard and head are not in close frictional contact, but rather the guard has free play between the intermediate member 1 and the head 10.

A close relationship must be established between the two cutting members of the shears, as distinguished from the relation between the guard 5 and cutting jaw 1, and the necessary shearing co-action between the cutting edges is attained by providing an enlarged boss 11 on the bolt, upon which boss the guard member is journaled, and against which boss the intermediate member or cutting jaw 1 has a bearing when the nut 9 is screwed up tight. Thus, while the guard is comparatively free on its boss and is not in close frictional contact with the head and the intermediate member of the shears, the necessary close frictional contact between the two shearing members is necessary for making a clear and clean cut of the sheet metal, and the guard 5 prevents the edge of the cut metal from being marred or bent. The plane edge of the guard bearing down on the edge of the metal or sheet being cut holds the metal stable while it is being sheared or severed by the beveled cutting edges, and the movement of the guard with the cutting jaw 6 permits the cutting edge 2 of the jaw 1 to pass into the space between the bifurcated ends of the member 4 to make a clear and clean cut.

By the utilization of the rigid cutting jaw and its guard which together co-act with the intermediate cutting jaw the metal may be severed with facility and the jaws will clear themselves of the metal thus eliminating the objectionable feature that is present in many sheet metal shears of having the edge of the metal get jammed or caught between the two cutting edges requiring the withdrawal of the shears and loss of time and labor in making a cut. As before stated the combined guard and jaw, co-acting with the intermediate jaw provide a clean and clear severance of the sheet.

What I claim is:

The combination with the handle having a bifurcated end formed with an externally beveled cutting edge and a spaced guard of equal length, of a crossed handle with a cutting jaw pivoted in the bifurcated end, a pivot bolt passed through the two cutting members, an enlarged bearing boss on the bolt loose in the guard and having a flat bearing face for said cutting jaw, a head on the bolt outside the guard and a nut on the opposite end of the bolt to tighten the cutting members against said boss.

In testimony whereof I affix my signature.

DOLPH JOHNSON.